United States Patent
Jinno et al.

(10) Patent No.: US 12,194,494 B2
(45) Date of Patent: Jan. 14, 2025

(54) METHOD FOR APPLYING MULTI-LAYERED COAT ONTO AUTOMOTIVE COMPONENT MOLDED PRODUCT

(71) Applicant: NIPPON PAINT AUTOMOTIVE COATINGS CO., LTD., Hirakata (JP)

(72) Inventors: Nobusuke Jinno, Hirakata (JP); Yoshiki Takaira, Hirakata (JP); Naoto Kozakura, Hirakata (JP); Yutaka Kubo, Hirakata (JP); Shinichi Horii, Hirakata (JP)

(73) Assignee: NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 0 days.

(21) Appl. No.: 18/029,989

(22) PCT Filed: Oct. 4, 2021

(86) PCT No.: PCT/JP2021/036660
§ 371 (c)(1),
(2) Date: Apr. 3, 2023

(87) PCT Pub. No.: WO2022/075271
PCT Pub. Date: Apr. 14, 2022

(65) Prior Publication Data
US 2023/0372969 A1    Nov. 23, 2023

(30) Foreign Application Priority Data

Oct. 5, 2020    (JP) ................................ 2020-168728

(51) Int. Cl.
*B05D 7/00* (2006.01)
*C09D 7/61* (2018.01)
*C09D 133/14* (2006.01)

(52) U.S. Cl.
CPC ............... *B05D 7/532* (2013.01); *C09D 7/61* (2018.01); *C09D 133/14* (2013.01)

(58) Field of Classification Search
CPC ......... B05D 7/532; C09D 7/61; C09D 133/14
See application file for complete search history.

(56) References Cited

U.S. PATENT DOCUMENTS

2004/0191418 A1    9/2004    Suwama et al.
2008/0108743 A1    5/2008    Tomizaki et al.

FOREIGN PATENT DOCUMENTS

| CN | 105518091  | 4/2016  |
|----|------------|---------|
| JP | 1-110571   | 4/1989  |
| JP | 7-35493    | 4/1995  |
| JP | 2003-313493| 11/2003 |
| JP | 2004-154625| 6/2004  |
| JP | 2004-314060| 11/2004 |
| JP | 2008-138179| 6/2008  |
| JP | 2010-82529 | 4/2010  |
| JP | 2010-82598 | 4/2010  |
| JP | 2010-260014| 11/2010 |
| JP | 2015-66543 | 4/2015  |
| JP | 6422867    | 11/2018 |

OTHER PUBLICATIONS

International Search Report (ISR) issued Oct. 26, 2021 in International (PCT) Application No. PCT/JP2021/036660.
Office Action issued Sep. 12, 2023, in corresponding Japanese Patent Application No. 2020-168728, with English-language translation.
English language translation of International Preliminary Report on Patentability issued Mar. 28, 2023 in corresponding International (PCT) Patent Application No. PCT/JP2021/036660.

*Primary Examiner* — Robert S Walters, Jr.
(74) *Attorney, Agent, or Firm* — WENDEROTH, LIND & PONACK, L.L.P.

(57) ABSTRACT

The present invention provides a coloring base coating material capable of forming a base coating film superior in design property (e.g., unevenness of a luster pigment), adhesion, and water resistance while satisfying environmental considerations such as shortening of drying time, and also provides a coated article obtained from the coloring base coating material. The present invention provides a coating method including: a step of applying a coloring base coating material to a molded article for an automobile part made of a plastic material to form an uncured first coating film, a step of applying a two-pack clear coating material to the uncured first coating film to form an uncured second coating film, and a step of baking and curing the uncured first coating film and the uncured second coating film to form a multilayer coating film, wherein the coloring base coating material is specified.

5 Claims, No Drawings

METHOD FOR APPLYING MULTI-LAYERED COAT ONTO AUTOMOTIVE COMPONENT MOLDED PRODUCT

TECHNICAL FIELD

The present invention relates to a method for applying a multilayer coating film onto a molded article for an automobile part made of a plastic material.

BACKGROUND ART

Usually, on a substrate constituting an automobile, a multilayer coating film including a base coating film and a clear coating film formed thereon is provided for the purpose of imparting design, resistance, and the like. Recently, automobile part molded articles made of a plastic material are often used from the viewpoint of weight reduction and the like, and a multilayer coating film is also formed on the surface of such automobile part molded articles to unify the design property and the appearance. The method for forming a multilayer coating film needs to satisfy environmental consideration, facilitation of coating work, and restriction of the amount of heat applied to plastic products. Methods for forming a multilayer coating film are disclosed in, for example, Patent Literature 1 and Patent Literature 2.

CITATIONS LIST

Patent Literature

Patent Literature 1: JP-A-2008-138179
Patent Literature 2: JP-A-2010-82529

SUMMARY OF INVENTION

Technical Problems

From the viewpoint of environmental consideration, in Patent Literature 1, a coloring base coating material of not a solvent type but an aqueous type is studied. However, an aqueous coloring base coating material inevitably needs energy to evaporate water for drying or curing, so that it lacks consideration for the environment in terms of energy and leads to an increased amount of heat to be applied to a plastic molded article.

In Patent Literature 2, not an aqueous coloring base coating material but a solvent type coloring base coating material is used, and a 3-coat 1-bake system in which three layers (intermediate coating, base, and clear) are applied and then are cured at the same time is adopted, thereby limiting the amount of heat to be applied to a plastic product and simultaneously satisfying the environmental consideration. However, in the 3-coat 1-bake coating method by the method of Cited Document 2, although the environment could be taken into consideration in terms of the amount of heat, it is desired to further limit the volatilization of an organic solvent (so-called VOC restriction), and the coating method of the prior art is not necessarily sufficient.

Recently, automobile part manufacturers have started studies to shorten the time of a coating application step, and there is a demand for a coating material that forms a coating film having a sufficient thickness in a short time. One of the methods for shortening the application time is a method involving increasing the application speed (gun speed), but if the gun speed is increased, a sufficient film thickness cannot be secured unless the discharge amount is increased. The discharge amount depends on the solid content of the coating material, and increasing only the discharge amount exceeds the performance of an applicator, and it is observed that the coating efficiency is deteriorated and the coating appearance such as unevenness and smoothness is deteriorated. For this reason, a coating material with a high solid content that is capable of developing a highly designed coating appearance is desired.

The present invention has been devised in view of the above circumstances, and the present invention provides a method for applying a multilayer coating film onto a molded article for an automobile part made of a plastic material, in which a high-solid-content (or high-solid) solvent type coating material is used and a multilayer coating film superior in design property (e.g., unevenness of a luster pigment), adhesion, and water resistance is formed while environmental considerations such as shortening of drying time are satisfied.

Solutions to Problems

The present invention provides the following modes.

[1] A method for applying a multilayer coating film onto a molded article for an automobile part made of a plastic material, the method including: a step of applying a coloring base coating material onto the molded article for an automobile part to form an uncured first coating film; a step of applying a two-pack clear coating material onto the uncured first coating film to form an uncured second coating film; and a step of baking and curing the uncured first coating film and the uncured second coating film to form a multilayer coating film, wherein the coloring base coating material is a coloring base coating material including: a pigment (A), a hydroxy group-containing acrylic resin (B), a blocked isocyanate compound (C), crosslinked polymer fine particles (D) insoluble and stably dispersed in a solution of the hydroxy group-containing acrylic resin (B), and an acrylic resin (E) having a weight average molecular weight different from that of the hydroxy group-containing acrylic resin (B); the coloring base coating material has a solid content of 35% by mass or more; when, using a cone-plate viscometer, a viscosity V1 is measured at a shear of 0.1/sec at 23° C., then the shear is changed from 0.1/sec to 25000/sec and applied for 30 seconds, and subsequently a viscosity V2 is measured after the shear is returned to 0.1/sec and then applied for one second, a viscosity recovery rate V2/V1, which is a ratio of V2 to V1, is 90% or more; and the two-pack clear coating composition includes: a hydroxy group-containing polymer (F) and an isocyanate compound (G).

[2] The method for applying a multilayer coating film onto a molded article for an automobile part of [1], wherein the hydroxy group-containing acrylic resin (B)
 is a polymer of one or more monomers including a hydroxy group-containing monomer (b), wherein the hydroxy group-containing monomer (b) is a lactone-modified product of a monoester compound derived from (meth)acrylic acid with a dihydric alcohol having 2 or more and 8 or less carbon atoms, has a weight average molecular weight of 10000 or more and 20000 or less, has a glass transition temperature of 10° C. or higher and 40° C. or lower, and has a hydroxyl value of 10 mg KOH/g or more and 50 mg KOH/g or less.

[3] The method for applying a multilayer coating film onto a molded article for an automobile part of [1] or [2], wherein the acrylic resin (E) has a weight average molecular weight of 3000 or more and 7500 or less.

[4] The method for applying a multilayer coating film onto a molded article for an automobile part of any one of [1] to [3], wherein an intermediate coating film or a primer coating film is formed in advance on the molded article for an automobile part.

[5] A coated article produced by the method for applying a multilayer coating film onto a molded article for an automobile part of any one of [1] to [4].

Advantageous Effects of Invention

Since the solid content is high in the present invention as compared with the conventional coloring base coating materials, the amount of an organic solvent to be released is reduced and the coloring base coating material can be applied thickly, so that the application time and the drying time are shortened. In addition, as compared with a coating method using an aqueous coating material, the necessity of a preheating step is eliminated, so that energy consumption can be greatly improved and a coating facility is made compact. Therefore, it can be said to be a superior coating method.

A multilayer coating film formed on an automobile part molded article made of a plastic material and obtained by the coating method of the present invention is superior in adhesion to the automobile part molded article, and at the same time, it can provide a multilayer coating film having superior design property with few defects such as coating film peeling.

The coloring base coating material to be used in the coating method of the present invention is superior in the orientation of a pigment (especially, a luster pigment) blended even at a high solid content, and is also superior in the adhesion to the coating films provided above and below the base coating film, and thus provides a multilayer coating film having a superior appearance without disturbing the orientation of a luster pigment blended.

DESCRIPTION OF EMBODIMENTS

The present invention is directed to a method for applying a multilayer coating film onto a molded article for an automobile part made of a plastic material, the method including: a step of applying a coloring base coating material onto the molded article for an automobile part to form an uncured first coating film; a step of applying a two-pack clear coating material onto the uncured first coating film to form an uncured second coating film; and a step of baking and curing the uncured first coating film and the uncured second coating film to form a multilayer coating film, wherein the coloring base coating material is one including: a pigment (A), a hydroxy group-containing acrylic resin (B), a blocked isocyanate compound (C), crosslinked polymer fine particles (D) insoluble and stably dispersed in a solution of the hydroxy group-containing acrylic resin (B), and an acrylic resin (E) having a weight average molecular weight different from that of the hydroxy group-containing acrylic resin (B); and wherein the coloring base coating material has a solid content is 35% by mass or more; when, using a cone-plate viscometer, a viscosity V1 is measured at a shear of 0.1/sec at 23° C., then the shear is changed from 0.1/sec to 25000/sec and applied for 30 seconds, and subsequently a viscosity V2 is measured after the shear is returned to 0.1/sec and then applied for one second, a viscosity recovery rate V2/V1, which is a ratio of V2 to V1, is 90% or more; and the two-pack clear coating composition includes: a hydroxy group-containing polymer (F) and an isocyanate compound (G).

Hereinafter, the coating method and the coloring base coating material according to the embodiment of the present invention will be described in detail.

[Coating Method]

In the coating method of the present invention, a multilayer coating film is formed on a molded article for an automobile part made of a plastic material. The molded article for an automobile part is not particularly limited, but needs to be made of a plastic material. Examples of the plastic material include polypropylene resin, polycarbonate resin, urethane resin, polyester resin, polystyrene resin, ABS resin, vinyl chloride resin, and polyamide resin. Specifically, examples of the molded article for an automobile part made of a plastic material include spoilers, bumpers, mirror covers, grills, and doorknobs. These plastic substrates are preferably those having been degreased with a solvent such as petroleum benzine or isopropanol or washed with pure water and/or a neutral detergent. The automobile part molded article made of a plastic material may be a foam.

In the present invention, the molded article for an automobile part is coated with a coloring base coating material in the first step, and the molded article may have been subjected in advance to primer coating or intermediate coating, as necessary. The intermediate coating film and the primer coating film are not particularly limited, and may be formed using, for example, an intermediate coating material or a primer coating material comprising a coating film-forming resin and, as necessary, a curing agent and the like. The intermediate coating or primer coating may be subjected to the subsequent coating application step, i.e., the application of a coloring base coating material, after being cured, but also may be subjected, in an uncured state, to a currently invented step of applying a coloring base coating material. The uncured primer coating film or the uncured intermediate coating film is cured in the step of forming a multilayer coating film by the final baking and curing.

When the intermediate coating composition or the primer coating composition described above is applied to a molded article for an automobile part to form an uncured intermediate coating film or an uncured primer coating film, for example, a preheating step at a temperature of 40° C. or higher and 80° C. or lower for 1 minute or more and 10 minutes or less may be carried out, as necessary. When an uncured intermediate coating film is formed, the film thickness thereof may be, for example, 5 μm or more and 30 μm or less, and may be 7 μm or more and 25 μm or less as a dry film thickness. When an uncured primer coating film is formed, the film thickness thereof may be, for example, 3 μm or more and 15 μm or less, and may be 5 μm or more and 10 μm or less as a dry film thickness.

In the coating method of the present invention, subsequently, the coloring base coating material is applied to form an uncured first coating film, the two-pack clear coating material is applied to the uncured first coating film to form a second coating film, and then the first coating film and the second coating film are baked and cured to form the multilayer coating film of the present invention. The method for forming a coating film may be a commonly used method. For example, uncured coating films, which are called wet-on-wet, are formed through application using a spray applicator, and then two or three layers (a multilayer coating film including a primer coating film or an intermediate coating film) are cured simultaneously.

In the present invention, as described above, the coloring base coating material is applied to form an uncured first coating film. At this time, for example, a setting step may be carried out at room temperature for 1 minute or more and 10 minutes or less, as necessary. The film thickness of the uncured first coating film may be, for example, 7 μm or more and 30 μm or less, and may be 12 μm or more and 25 μm or less as a dry film thickness.

In the present invention, a two-pack clear coating material is applied to the uncured first coating film to form an uncured second coating film. At this time, for example, a setting step may be carried out at room temperature for 1 minute or more and 10 minutes or less, as necessary. The film thickness of the uncured second coating film may be, for example, 15 μm or more and 40 μm or less, and may be 20 μm or more and 30 μm or less as a dry film thickness.

In the present invention, an uncured first coating film and an uncured second coating film, that is, an uncured intermediate coating film or an uncured primer coating film, as necessary, and an uncured first coating film of the present invention, and an uncured second coating film are heated and cured to form a multilayer coating film. The heating and curing temperature may be, for example, 70° C. or higher and 140° C. or lower, and the heating and curing time may be appropriately adjusted, for example, within a range of 10 minutes or more and 40 minutes or less after reaching a target temperature.

The methods for applying the intermediate coating material, the primer coating material, the coloring base coating material, and the two-pack clear coating material are not particularly limited. According to the type of the molded article for an automobile part (hereinafter sometimes also referred to as "article to be coated"), a coating method commonly used in the coating field, for example, multi-stage coating or one-stage coating by air spray coating, bell coating, or air electrostatic spray coating, or a coating method in which air electrostatic spray coating is combined with a rotary atomization type electrostatic applicator, which is called a metallic bell, may be used.

Examples of the heating device to be used to heat and cure uncured coating films include a drying furnace using a heating source such as hot air, electricity, gas, or infrared rays. It is preferable to use a drying furnace in which two or more of these heating sources are used in combination because the drying time is shortened.

By the method for producing a coated article according to the embodiment of the present invention, upper coating films are sequentially formed on an uncured coating film and the plurality of undried coating films are collectively heated and cured, so that the process can be shortened, which is preferable from the viewpoint of economy and environment. In the embodiment of the present invention, a multilayer coating film can be formed in a mode in which a step of forming an intermediate coating film and a primer coating film is omitted and neither an intermediate coating film nor a primer coating film is included.

[Coloring Base Coating Material]

The coloring base coating material according to the embodiment of the present invention comprises a pigment (A), a hydroxy group-containing acrylic resin (B), a blocked isocyanate compound (C), crosslinked polymer fine particles (D) insoluble and stably dispersed in the hydroxy group-containing acrylic resin (B) solution, and an acrylic resin (E) having a weight average molecular weight different from that of the hydroxy group-containing acrylic resin (B). Each of the components will be described.

(1) Pigment (A)

The pigment (A) comprises one or more member selected from the group consisting of coloring pigments and scaly pigments.

Examples of the coloring pigments include organic coloring pigments such as azo chelate pigments, insoluble azo pigments, condensed azo pigments, diketopyrrolopyrrole pigments, benzimidazolone pigments, phthalocyanine pigments, indigo pigments, perinone pigments, perylene pigments, dioxane pigments, quinacridone pigments, isoindolinone pigments, and metal complex pigments; and inorganic coloring pigments such as chrome yellow, yellow iron oxide, red iron oxide, carbon black, and titanium dioxide.

Examples of the scaly pigment include metal flakes, metal oxide flakes, pearl pigments, and mica. Examples of the metal flake include aluminum, chromium, gold, silver, copper, brass, titanium, nickel, nickel chromium, and stainless steel. Examples of the metal oxide flake include oxides of metal flakes, for example, alumina and chromium oxide.

In a mode in which the coloring base coating material contains a scaly pigment, metallic luster can be imparted to a base coating film, and as described later, a base coating film that exhibits a more remarkable change in color tone depending on the angle at which the base coating film is observed, in other words, that has a high flip-flop property (hereinafter sometimes referred to as "FF property") can be formed.

Further, in order to easily prevent a metal flake, a metal oxide flake, a pearl pigment, and the like from reacting with water to generate gas, metal coating, e.g. a coating of a metal compound such as molybdic acid, chromic acid, yttrium and a rare earth metal, or an organic polymer coating, e.g. a coating of an organic polymer prepared using a polymerizable monomer, may be formed on the metal flake, the metal oxide flake, and the pearl pigment. For example, the metal flake, the metal oxide flake, and the pearl pigment may have a coating containing silicon dioxide, zirconium oxide, aluminum oxide, chromium oxide, polymerized synthetic resins, vanadium oxides, molybdenum oxides and/or molybdenum peroxides, phosphates, phosphites, borates, chromates, and mixtures or combinations thereof. For example, in the case of using chromium oxide or the like, toxicity can be removed by using a chemically inactivated material.

The scaly pigment may contain a vapor-deposited metal pigment. Such scaly pigments are generally prepared by vapor depositing a metal thin film (metal oxide thin film) on a base film, peeling off the base film, and then pulverizing the vapor-deposited metal film to yield metal flakes (metal oxide flakes). As the metal material to be vapor-deposited, for example, the materials described for the metal flake and the metal oxide flake can be used. In this embodiment, the scaly pigment is preferably vapor-deposited aluminum pigment, vapor-deposited chromium pigment, vapor-deposited alumina pigment, or vapor-deposited chromium oxide pigment. As for also the vapor-deposited metal pigment, the above-described coating may be formed on the surface thereof, as necessary.

Examples of commercially available scaly pigments include METALURE (registered trademark) series, SILVERSHINE (registered trademark) series, HYDROSHINE (registered trademark) series, Liquid Black (registered trademark), PLISMATIC (registered trademark) series produced by ECKART, FD series, GX series and BS series produced by Asahi Kasei Chemicals Corporation, and 46 series and 63 series produced by Toyo Aluminium K.K. Two or more kinds of the pigment (A) may be used in combination.

The content of the pigment (A) is not particularly limited, and for example, the pigment concentration of the pigment (A), that is, the mass ratio of the pigment (A) to the resin solid of the coloring base coating material may be 1% by mass or more and 20% by mass or less. The resin solid of the coloring base coating material means a resin component, a blocked isocyanate compound (C), and other curing agents that can be contained.

The coloring base coating material may contain an extender pigment. Examples of the extender pigment include calcium carbonate, barium sulfate, clay, and talc.

When an extender pigment is used, a single extender pigment may be used or two or more extender pigments may be used in combination. When the coloring base coating material contains an extender pigment, the content of the extender pigment, for example, the mass ratio of the extender pigment to the resin solid of the coloring base coating material, may be 0.1% by mass or more and 20% by mass or less.

(2) Hydroxy Group-Containing Acrylic Resin (B)

Any hydroxy group-containing acrylic resin may be used as the hydroxy group-containing acrylic resin (B) as long as it is an acrylic resin having a hydroxy group usually used for coating materials. The hydroxy group-containing acrylic resin (B) is a polymer of one or more monomers including a hydroxy group-containing monomer (b), and the hydroxy group-containing monomer (b) is preferably a lactone-modified product of a monoester compound derived from (meth)acrylic acid and a dihydric alcohol having 2 or more and 8 or less carbon atoms. The hydroxy group-containing acrylic resin (B) has a weight average molecular weight of 10,000 or more and 20,000 or less, a glass transition temperature of 10° C. or higher and 40° C. or lower, and a hydroxyl value of 10 mg KOH/g or more and 50 mg KOH/g or less.

Owing to containing the hydroxy group-containing acrylic resin (B), the coating viscosity does not become excessively high even when the solid content of the coloring base coating material is as high as 35% by mass or more, so that unevenness of a coating film can be reduced. Furthermore, when the coloring base coating material contains a scaly pigment, the orientation of the scaly pigment is less likely to be disturbed, so that a superior FF property (flip-flop property: a property of the degree of brightness of a coating film surface to change depending on a viewing angle) can be obtained. The upper limit of the solid content of the coloring base coating material is not particularly limited, and may be, for example, 60% by mass or less.

Furthermore, since the hydroxy group-containing acrylic resin (B) is prepared through polymerization using a hydroxy group-containing monomer (b) that is a lactone-modified product of a monoester compound derived from (meth)acrylic acid and a dihydric alcohol having 2 or more and 8 or less carbon atoms, the hydroxy group-containing acrylic resin (B) has, in a side chain, a long chain structure having a hydroxy group. This makes it possible to enhance the reactivity with an isocyanate compound (C) that is a curing agent and also possible to enhance the adhesion between an article to be coated and a base coating film or the adhesion between an intermediate coating film or a primer coating film provided on the article to be coated and the base coating film. For example, when the article to be coated is an automobile part made of a plastic material, the coloring base coating material according to the embodiment of the present invention can form a base coating film having good adhesion to the article without providing a primer coating film on the article.

The hydroxy group-containing acrylic resin (B) is obtained by polymerizing one or more monomers including the hydroxy group-containing monomer (b) in accordance with a conventional method.

Examples of the hydroxy group-containing monomer (b) include a lactone-modified product obtained by modifying a monoesterified product derived from (meth)acrylic acid and a dihydric alcohol having 2 or more and 8 or less carbon atoms, such as 2-hydroxyethyl (meth)acrylate, 2-hydroxypropyl (meth)acrylate, 3-hydroxypropyl (meth)acrylate, or 4-hydroxybutyl (meth)acrylate, with a lactone, such as ε-caprolactone.

In the present description, "(meth)acryl" means both acryl and methacryl.

The hydroxy group-containing acrylic resin (B) may be a polymer of the hydroxy group-containing monomer (b) and another monomer other than the hydroxy group-containing monomer (b). In this embodiment, the hydroxy group-containing acrylic resin (B) is obtained by polymerizing a monomer mixture of the hydroxy group-containing monomer (b) and the other monomer, and the hydroxy group-containing monomer (b) is preferably 5% by mass or more and 20% by mass or less in the total of the hydroxy group-containing monomer (b) and the other monomer.

Examples of the monomers other than the hydroxy group-containing monomer (b) include acid group-containing monomers such as acrylic acid, methacrylic acid, acrylic acid dimer, crotonic acid, 2-acryloyloxyethylphthalic acid, 2-acryloyloxyethylsuccinic acid, ω-carboxy-polycaprolactone mono(meth)acrylate, isocrotonic acid, α-hydro-ω-((1-oxo-2-propenyl)oxy) poly(oxy(1-oxo-1,6-hexanediyl)), maleic acid, fumaric acid, itaconic acid, 3-vinylsalicylic acid, 3-vinylacetylsalicylic acid, 2-acryloyloxyethyl acid phosphate, and 2-acrylamido-2-methylpropanesulfonic acid.

Examples of the monomer other than the hydroxy group-containing monomer (b) include (meth)acrylate esters (e.g., methyl (meth)acrylate, ethyl (meth)acrylate, n-propyl (meth)acrylate, n-butyl (meth)acrylate, isobutyl (meth)acrylate, t-butyl (meth)acrylate, 2-ethylhexyl (meth)acrylate, lauryl methacrylate, phenyl acrylate, isobornyl (meth)acrylate, cyclohexyl methacrylate, t-butylcyclohexyl (meth)acrylate, dicyclopentadienyl (meth)acrylate, and dihydrodicyclopentadienyl (meth)acrylate), polymerizable aromatic compounds (e.g., styrene, α-methylstyrene, vinyl ketone, t-butylstyrene, parachlorostyrene, and vinylnaphthalene), polymerizable nitriles (e.g., acrylonitrile and methacrylonitrile), α-olefins (e.g., ethylene and propylene), vinyl esters (e.g., vinyl acetate and vinyl propionate), and dienes (e.g., butadiene and isoprene). From the viewpoint of enhancing water resistance, styrene is preferably used.

Examples of the monomer other than the hydroxy group-containing monomer (b) further include hydroxyethyl (meth)acrylate, hydroxypropyl (meth)acrylate, hydroxybutyl (meth)acrylate, allyl alcohol, and methacryl alcohol.

As the hydroxy group-containing monomer (b), a single alcohol may be used or two or more alcohols may be used in combination. As the monomer other than the hydroxy group-containing monomer (b), a single monomer may be used or two or more monomers may be used in combination.

The weight average molecular weight of the hydroxy group-containing acrylic resin (B) may be, for example, 10,000 or more, and may be 20,000 or less.

The weight average molecular weight may be determined, for example, by gel permeation chromatography (GPC) using polystyrene as a standard.

The glass transition temperature of the hydroxy group-containing acrylic resin (B) may be, for example, 10° C. or higher, and may be 40° C. or lower.

The glass transition temperature may be one actually measured or calculated by a known method. For example, the glass transition temperature may be measured using a differential scanning calorimeter (DSC) in accordance with JIS K 7121.

The hydroxyl value of the hydroxy group-containing acrylic resin (B) may be, for example, 10 mg KOH/g or more, and may be, for example, 50 mg KOH/g or less. The acid value of the hydroxy group-containing acrylic resin (B) may be, for example, 0.2 mg KOH/g or more, and may be, for example, 20 mg KOH/g or less.

The hydroxyl value and the acid value may be those actually measured or calculated by a known method. For example, the hydroxyl value and the acid value may be measured in accordance with JIS K 0070:1992.

As the hydroxy group-containing acrylic resin (B), two or more resins may be used in combination. The content of the hydroxy group-containing acrylic resin (B) in the coloring base coating material is not particularly limited, and may be, for example, 30% by mass or more and 70% by mass or less, and may be 40% by mass or more, and may be 60% by mass or less, in the resin solid content of the coloring base coating material.

(3) Blocked Isocyanate Compound (C)

By using the blocked isocyanate compound (C) together with the hydroxy group-containing acrylic resin (B), it is possible to enhance the adhesion between an article to be coated and a base coating film or the adhesion between an intermediate coating film or a primer coating film provided on an article to be coated and a base coating film. In addition, a base coating film is crosslinked, so that the physical properties of the base coating film are improved and the water-resisting performance is improved.

The blocked isocyanate compound (C) can be prepared by blocking a polyisocyanate with a blocking agent.

Examples of the polyisocyanate include aliphatic diisocyanates such as hexamethylene diisocyanate (including a trimer), pentamethylene diisocyanate, tetramethylene diisocyanate, and trimethylhexamethylene diisocyanate; alicyclic polyisocianates such as isophorone diisocyanate and 4,4'-methylenebis(cyclohexyl isocyanate); aromatic diisocyanates such as 4,4'-diphenylmethane diisocyanate, tolylene diisocyanate, and xylylene diisocyanate; and modified materials thereof (urethanized materials, materials modified with carbodiimide, uretdione, uretonimine, biuret and/or isocyanurate).

Examples of the blocking agent that is preferably be used include monohydric alkyl (or aromatic) alcohols such as n-butanol, n-hexyl alcohol, 2-ethylhexanol, lauryl alcohol, phenol carbinol, and methylphenyl carbinol; cellosolves such as ethylene glycol monohexyl ether and ethylene glycol mono-2-ethylhexyl ether; polyether-type both-ended diols such as polyethylene glycol, polypropylene glycol, and polytetramethylene ether glycol phenol; polyester-type both-ended polyols obtained from a diol such as ethylene glycol, propylene glycol, or 1,4-butanediol and a dicarboxylic acid such as oxalic acid, succinic acid, adipic acid, suberic acid, or sebacic acid; phenols such as para-t-butylphenol and cresol; oximes such as dimethyl ketoxime, methyl ethyl ketoxime, methyl isobutyl ketoxime, methyl amyl ketoxime, and cyclohexanone oxime; and lactams typified by s-caprolactam and γ-butyrolactam. As the blocking agent, methyl diketone, methyl ketoester, and methyl diester compounds, which are active hydrogen compounds, for example, alkyl esters such as acetylacetone, ethyl acetoacetate, and diethyl malonate may be used. In addition, a blocked isocyanate prepared using a pyrazole compound or an imidazole compound as a blocking agent may be used.

The blocking ratio of the blocked isocyanate compound (C) is preferably 100%. This affords an advantage that the storage stability of the coloring base coating material is further improved.

As the blocked isocyanate compound (C), two or more compounds may be used in combination.

The content of the blocked isocyanate compound (C) is not particularly limited, but from the viewpoint of more appropriately accelerating a curing reaction, the ratio (NCO/OH) of the number of moles of the isocyanate groups of the blocked isocyanate compound (C) to the number of moles of the hydroxy groups of the hydroxy group-containing acrylic resin (B) may be 0.2/1.0 to 0.6/1.0, and is preferably 0.3/1.0 to 0.5/1.0.

The coloring base coating material may contain, as a curing agent other than the blocked isocyanate compound (C), another curing agent such as an amino resin such as melamine resin, guanamine resin, or urea resin. When another curing agent other than the blocked isocyanate compound (C) is contained, the content of the other curing agent is, for example, 10 parts by mass or more and 30 parts by mass or less, based on 100 parts by mass of the resin solid content of the coloring base coating material.

(4) Crosslinked Polymer Fine Particles (D)

The crosslinked polymer fine particles (D) are added as a viscosity modifier, and contribute to the adjustment of the viscosity. Usually, a coating material is reduced in viscosity by a shearing force applied during coating application, and thus the viscosity immediately after the coating application is lower than the viscosity before the coating application. For this reason, when the viscosity after application is low, the coating material runs down, which causes unevenness of a coating film. When the coloring base coating material according to the embodiment of the present invention contains the crosslinked polymer fine particles (D), the viscosity reduced during application can be quickly recovered and increased, the coloring base coating material applied to an article to be coated can be inhibited from sagging, and unevenness of a coating film can be reduced.

The crosslinked polymer fine particles (D) can be prepared by polymerizing a monomer mixture. The polymerization method may be any polymerization method as long as crosslinked fine particles can be obtained, and may be multistage polymerization. More specifically, emulsion polymerization is suitably used.

Crosslinked Polymer Fine Particles (D) Obtained by Emulsion Polymerization

The crosslinked polymer fine particles (D) to be used in the present invention are obtained by forming an emulsion containing crosslinked polymer fine particles by emulsion polymerizing an ethylenically unsaturated monomer and a crosslinkable copolymerizable monomer in an aqueous medium by a known method followed by removal of water by solvent replacement, azeotropy, centrifugal separation, filtration, drying, or the like. The emulsion polymerization may be carried out using a known emulsifier and/or dispersant, but it is preferable to use an emulsifier having a zwitterionic group. When the crosslinked polymer fine particles (D) are added to a coating composition, the structural viscosity varies depending on the particle size of the crosslinked polymer fine particles. Therefore, it is important to obtain crosslinked polymer fine particles uniform in particle size. The use of an emulsifier having a zwitterionic group is preferable because this makes it easy to obtain crosslinked polymer fine particles uniform in particle size.

Examples of the ethylenically unsaturated monomer to be used for the preparation of the crosslinked polymer fine particles (D) include alkyl esters of acrylic acid or methacrylic acid such as methyl (meth)acrylate, ethyl (meth)acrylate, n-butyl (meth)acrylate, isobutyl (meth)acrylate, and 2-ethylhexyl (meth)acrylate, and other monomers having an ethylenically unsaturated bond that can be copolymerized with those alkyl esters, such as styrene, α-methylstyrene, vinyltoluene, t-butylstyrene, ethylene, propylene, vinyl acetate, vinyl propionate, acrylonitrile, methacrylonitrile, and dimethylaminoethyl (meth)acrylate. Two or more of these monomers may be used.

Crosslinkable copolymerizable monomers include a monomer having two or more radically polymerizable ethylenically unsaturated bonds in the molecule and/or two ethylenically unsaturated group-containing monomers that carry groups capable of reacting with each other, respectively.

Examples of the monomer having two or more radically polymerizable ethylenically unsaturated groups in the molecule include polymerizable unsaturated monocarboxylic acid esters of polyhydric alcohols, polymerizable unsaturated alcohol esters of polybasic acids, and aromatic compounds substituted with two or more vinyl groups, and examples thereof include the following compounds.

Ethylene glycol diacrylate, ethylene glycol dimethacrylate, triethylene glycol dimethacrylate, tetraethylene glycol dimethacrylate, 1,3-butylene glycol dimethacrylate, trimethylolpropane triacrylate, trimethylolpropane trimethacrylate, 1,4-butanediol diacrylate, neopentyl glycol diacrylate, 1,6-hexanediol diacrylate, pentaerythritol diacrylate, pentaerythritol triacrylate, pentaerythritol tetraacrylate, pentaerythritol dimethacrylate, pentaerythritol trimethacrylate, pentaerythritol tetramethacrylate, glycerol dimethacrylate, glycerol diacrylate, glycerol allyloxy dimethacrylate, 1,1,1-trishydroxymethylethane diacrylate, 1,1,1-trishydroxymethylethane triacrylate, 1,1,1-trishydroxymethylethane dimethacrylate, 1,1,1-trishydroxymethylethane trimethacrylate, 1,1,1-trishydroxymethylpropane diacrylate, 1,1,1-trishydroxymethylpropane triacrylate, 1,1,1-trishydroxymethylpropane dimethacrylate, 1,1,1-trishydroxymethylpropane trimethacrylate, triallyl cyanurate, triallyl isocyanurate, triallyl trimellitate, diallyl terephthalate, diallyl phthalate, and divinylbenzene.

Furthermore, as a monomer for the purpose of crosslinking, instead of the monomer having two or more radically polymerizable ethylenically unsaturated groups in the molecule or, as desired, together therewith, a monomer having two ethylenically unsaturated groups that carry groups capable of reacting with each other, respectively can also be used. Examples thereof include glycidyl group-containing ethylenically unsaturated monomers such as glycidyl methacrylate and glycidyl acrylate, and carboxyl group-containing ethylenically unsaturated monomers such as acrylic acid, methacrylic acid, and crotonic acid; and hydroxy group-containing ethylenically unsaturated monomers such as 2-hydroxyethyl acrylate, hydroxypropyl acrylate, 2-hydroxyethyl methacrylate, hydroxypropyl methacrylate, hydroxybutyl acrylate, hydroxybutyl methacrylate, allyl alcohol, and methallyl alcohol, and ethylenically unsaturated monomers having an isocyanate group such as vinyl isocyanate and isopropenyl isocyanate. However, in addition to these, any combination of two ethylenically unsaturated monomers that carry groups capable of reacting with each other, respectively, can be used.

The monomer constituting the crosslinked polymer fine particles (D) may contain a monomer having a functional group capable of reacting with a crosslinking agent. Examples thereof include carboxyl group-containing monomers such as acrylic acid, methacrylic acid, crotonic acid, itaconic acid, maleic acid, and fumaric acid; hydroxy group-containing monomers such as 2-hydroxyethyl acrylate, hydroxypropyl acrylate, 2-hydroxyethyl methacrylate, hydroxypropyl methacrylate, hydroxybutyl acrylate, hydroxybutyl methacrylate, allyl alcohol, and methacryl alcohol; and nitrogen-containing monomers such as acrylamide and methacrylamide.

Polymerizable Crosslinked Particles (D) Prepared by Non-Aqueous Dispersion Polymerization The monomer mixture to be used for the preparation of the crosslinked polymer fine particles (D) contains a radically polymerizable monomer. The monomer mixture may contain a radically polymerizable unsaturated monomer having a pendant side chain containing a higher unsaturated aliphatic group. When the monomer mixture contains a radically polymerizable unsaturated monomer having a pendant side chain containing a higher unsaturated aliphatic group, there is an advantage that crosslinked polymer fine particles can be suitably prepared.

Examples of the radically polymerizable unsaturated monomer having a pendant side chain containing a higher unsaturated aliphatic group include those obtained through a reaction of a higher unsaturated fatty acid with an ethylenically unsaturated glycidyl ester. As the higher unsaturated fatty acid, myristoleic acid, palmitoleic acid, oleic acid, linoleic acid, linolenic acid, ricinoleic acid, and the like can be used. Furthermore, drying oils having a non-conjugated double bond, such as linseed oil fatty acid, safflower oil fatty acid, soybean oil fatty acid, rice bran oil fatty acid, sesame oil fatty acid, castor oil fatty acid, dehydrated castor oil fatty acid, perilla oil fatty acid, hempseed oil fatty acid, cottonseed oil fatty acid, and tall oil fatty acid, semi-drying oil fatty acids, and the like can be used. The drying oils, semi-drying oil fatty acids, and the like include unsaturated fatty acids such as oleic acid, linoleic acid, linolenic acid, eleostearic acid, and ricinoleic acid. The average number of carbon atoms of the higher unsaturated aliphatic group is preferably 13 or more and 23 or less. A fatty acid having a conjugated double bond such as tung oil fatty acid may be used in combination in an amount of 30% by mass or less relative to the total saturated fatty acid. As the ethylenically unsaturated glycidyl ester, glycidyl acrylate, glycidyl methacrylate, methyl glycidyl acrylate, methyl glycidyl methacrylate, allyl glycidyl ether, methallyl glycidyl ether, and the like can be used. Among these, those obtained through a reaction of at least one selected from among oleic acid, linoleic acid, linolenic acid, safflower oil fatty acid, soybean oil fatty acid, castor oil fatty acid, dehydrated castor oil fatty acid, and tall oil fatty acid with glycidyl acrylate and/or glycidyl methacrylate are particularly preferable. Furthermore, as the radically polymerizable unsaturated monomer, those having an iodine value of 60 or more and 180 or less, particularly 70 or more and 150 or less are preferable.

Examples of other radically polymerizable unsaturated monomers other than the radically polymerizable unsaturated monomer having a pendant side chain containing a higher unsaturated aliphatic group contained in the monomer mixture include:

acrylate ester monomers such as methyl acrylate, ethyl acrylate, n-propyl acrylate, n-butyl acrylate, i-butyl acrylate, t-butyl acrylate, n-hexyl acrylate, n-octyl acrylate, i-octyl acrylate, 2-ethylhexyl acrylate, i-nonyl acrylate, stearyl acrylate, cyclohexyl acrylate, and benzyl acrylate;

methacrylate ester monomers such as methyl methacrylate, ethyl methacrylate, n-butyl methacrylate, i-butyl methacrylate, t-butyl methacrylate, n-hexyl methacrylate, n-octyl methacrylate, i-octyl methacrylate, 2-ethylhexyl methacrylate, i-nonyl methacrylate, n-dodecyl methacrylate, i-dodecyl methacrylate, stearyl methacrylate, cyclohexyl methacrylate, and benzyl methacrylate;

aromatic vinyl monomers such as styrene, vinyltoluene, and ethylvinylbenzene;

carboxyl group-containing monomers such as acrylic acid, methacrylic acid, itaconic acid, maleic acid, maleic anhydride, fumaric acid, crotonic acid, and citraconic acid;

amide group- or substituted amide group-containing monomers such as acrylamide, methacrylamide, N,N-dimethylacrylamide, N-methylacrylamide, and N-n-butoxymethylacrylamide;

hydroxy group-containing monomers such as 2-hydroxyethyl acrylate, 2-hydroxypropyl acrylate, 2-hydroxyethyl methacrylate, 2-hydroxypropyl methacrylate, allyl alcohol, and methallyl alcohol;

amino group- or substituted amino group-containing monomers such as aminoethyl acrylate, N,N-dimethylaminoethyl acrylate, N,N-diethylaminoethyl acrylate, N,N-dimethylaminoethyl methacrylate, and N,N-diethylaminoethyl methacrylate;

epoxy group-containing monomers such as glycidyl methacrylate, glycidyl acrylate, glycidyl allyl ether, glycidyl methallyl ether, and glycidyl vinyl ether;

mercapto group-containing monomers such as vinyl mercaptan and allyl mercaptan; and monomers having two or more radically polymerizable unsaturated groups in one molecule such as (poly) ethylene glycol di(meth)acrylate, neopentyl glycol di(meth)acrylate, trimethylolpropane tri(meth)acrylate, allyl (meth)acrylate, triallyl cyanurate, triallyl isocyanurate, diallyl phthalate, and divinylbenzene.

Among the other radically polymerizable unsaturated monomers, one or more members selected from the group consisting of:

acrylate ester monomers (preferably, ethyl acrylate, n-butyl acrylate, and the like), methacrylate ester monomers (preferably, methyl methacrylate, n-butyl methacrylate, and the like), carboxyl group-containing monomers (preferably, acrylic acid, methacrylic acid, ω-carboxy-polycaprolactone monoacrylate, and the like), and substituted amino group-containing monomers (preferably, N,N-di-lower alkylamino-lower alkyl (meth)acrylate such as N,N-dimethylaminoethyl acrylate or N,N-diethylaminoethyl methacrylate)

are preferably contained.

The amount of the radically polymerizable unsaturated monomer having a pendant side chain containing a higher unsaturated aliphatic group contained in the monomer mixture is preferably in a range of 0.5 parts by mass or more and 30 parts by mass or less, and more preferably in a range of 5 parts by mass or more and 15 parts by mass or less, based on 100 parts by mass of the total amount of the monomer mixture. The total amount of the acrylate ester monomer and the methacrylate ester monomer contained in the monomer mixture is preferably in a range of 50 parts by mass or more and 90 parts by mass or less based on 100 parts by mass of the total amount of the monomer mixture. The amount of the carboxyl group-containing monomer contained in the monomer mixture is preferably in the range of 10 parts by mass or less. Furthermore, the amount of the substituted amino group-containing monomer contained in the monomer mixture is preferably in a range of 10 parts by mass or less. When the crosslinked polymer fine particles (D) of the present invention are prepared by multistage polymerization, the amount of the monomers contained in the monomer mixture is the total of the amount of the monomer used in each polymerization.

The preparation of the crosslinked polymer fine particles (D) can be carried out with appropriate choice of polymerization conditions ordinarily used by those skilled in the art depending on the type and amount of the monomers to be used. For example, it is preferable to polymerize the monomer mixture such that the weight average molecular weight is made to fall within the range described later by heating and reacting the monomer mixture for several hours under stirring in a nitrogen stream or at a reflux temperature of an organic solvent using an appropriate polymerization initiator and a chain transfer agent used as necessary. The polymerization temperature is generally 30° C. or higher and 180° C. or lower, and preferably 60° C. or higher and 150° C. or lower.

Examples of the organic solvent to be used in the polymerization include: aliphatic or alicyclic hydrocarbon solvents such as cyclohexane, methylcyclohexane, cycloheptane, methylcycloheptane "LAWS", "Mineral Spirit EC", "SHELLZOL 71", "VM&P Naphtha", "Shell TS28 solvent" [manufactured by Shell], "ISOPAR C", "ISOPAR E", "ISOPAR G", "ISOPAR H", "ISOPAR M", "Naphtha 3", "Naphtha 5", "Naphtha 6", "Solvent 7" (manufactured by Exxon Chemical Co.), "IP Solvent 1016", "IP Solvent 1620", "IP Solvent 2028", "IP Solvent 2835" [manufactured by Idemitsu Kosan Co., Ltd.], "WHITE ZOL" [manufactured by Japan Energy Corporation], "Mitsubishi Mineral Turpentine", "Diamond Solvent", "Pegasol AN-45", and "Pegasol 3040" [manufactured by JXTG Energy Corporation];

aromatic hydrocarbon-based organic solvents such as benzene, toluene, ethylbenzene, propylbenzene, t-butylbenzene, o-xylene, m-xylene, p-xylene, tetralin, decalin, "Solvesso 100" (manufactured by Exxon Chemical Co.), and "Solvesso 150" (manufactured by Exxon Chemical Co.);

ketone-based organic solvents such as acetone, acetylacetone, methyl ethyl ketone, methyl-1-butyl ketone, methyl amyl ketone, and cyclohexanone;

ester-based organic solvents such as methyl acetate, ethyl acetate, n-butyl acetate, and aluminum acetate;

cellosolve-based organic solvents such as methyl cellosolve, ethyl cellosolve, n-propyl cellosolve, i-propyl cellosolve, n-butyl cellosolve, i-butyl cellosolve, i-amyl cellosolve, phenyl cellosolve, and benzyl cellosolve; and carbitol-based organic solvents such as methyl carbitol, ethyl carbitol, n-propyl carbitol, i-propyl carbitol, n-butyl carbitol, i-butyl carbitol, i-amyl carbitol, phenyl carbitol, and benzyl carbitol.

Examples of the polymerization initiator include organic peroxides such as benzoyl peroxide, lauroyl peroxide, caproyl peroxide, di-i-propyl peroxydicarbonate, di-2-ethylhexyl peroxydicarbonate, and t-butyl peroxypivalate; and azo compounds such as 2,2'-azobis-i-butylnitrile, 2,2'-azobis-2,4-dimethylvaleronitrile, and 2,2'-azobis-4-methoxy-2,4-dimethylvaleronitrile. These may be used singly or two or more thereof may be used in combination. The amount of the polymerization initiator used is generally preferably 0.5 parts by mass or more and 15 parts by mass or less, and more preferably 2 parts by mass or more and 8 parts by mass or less, based on 100 parts by mass of the total amount of the monomers.

When the crosslinked polymer fine particles (D) of the present invention are prepared by multistage polymerization, the preferred range of the amount of the polymerization initiator used may be applied to each polymerization.

In the case of subjecting a monomer mixture to two-stage polymerization in the preparation of the crosslinked polymer fine particles (D), a monomer mixture containing a radically polymerizable unsaturated monomer having a pendant side chain containing a higher unsaturated aliphatic group may be copolymerized and form a soluble part in a first polymerization stage, and then a monomer mixture free from a radically polymerizable unsaturated monomer having a pendant side chain containing a higher unsaturated aliphatic group or a monomer mixture containing a radically polymerizable unsaturated monomer having a pendant side chain containing a higher unsaturated aliphatic group may be copolymerized and form a grain part.

When the crosslinked polymer fine particles (D) have, for example, a soluble part and a grain part, the weight average molecular weight of the soluble part may be 15000 or more and 100,000 or less, and the grain part is preferably crosslinked by a monomer having two or more polymerizable unsaturated groups.

The weight average molecular weight may be determined, for example, by gel permeation chromatography (GPC) using polystyrene as a standard.

When the crosslinked polymer fine particles (D) have a soluble part and a grain part, the mass ratio of the soluble part to the grain part is preferably in the range of soluble part:grain part=20:80 to 80:20, and more preferably in the range of 30:70 to 70:30.

Another example of the preparation of the crosslinked polymer fine particles (D) is an example in which a monomer mixture free from a radically polymerizable unsaturated monomer having a pendant side chain containing a higher unsaturated aliphatic group is polymerized, and then a pendant side chain containing a higher unsaturated aliphatic group is introduced into the obtained copolymer. Specifically, for example, a monomer mixture containing an alkylene group-containing monomer is polymerized, and then a carboxyl group of a higher unsaturated fatty acid is reacted with an alkylene group of the obtained copolymer, whereby a pendant side chain containing a higher unsaturated aliphatic group can be introduced.

The blending amount of the crosslinked polymer fine particles (D) in the base coating composition is generally 5 to 40 parts by mass, and preferably 10 to 30 parts by mass, based on 100 parts by mass of the total solid content of the hydroxy group-containing acrylic resin (B), the blocked isocyanate compound (C), and the acrylic resin (E). If the blending amount of the crosslinked polymer fine particles (D) is excessively small, an increased ease of sagging of the base coating composition is afforded and, in the case of wet-on-wet coating, the permeation into an underlayer coating composition increases, so that the initial purpose is not achieved. On the other hand, if the blending amount is excessively large, the coating film performance is deteriorated and the smoothness of the coating is impaired, so that a highly finished appearance cannot be obtained.

Examples of commercially available products of the crosslinked polymer fine particles (D) include Setalux 1801, 1850, SA-50, and 53 (manufactured by Allnex GMBH).

(5) Acrylic Resin (E)

The coloring base coating material comprises an acrylic resin (E) having a weight average molecular weight different from that of the hydroxy group-containing acrylic resin (B). Owing to this, the viscosity of the coloring base coating material can be more easily adjusted.

The acrylic resin (E) can be obtained by polymerizing an α,β-ethylenically unsaturated monomer, and for example, the α, β-ethylenically unsaturated monomer described above for the hydroxy group-containing acrylic resin (B), or the like may be used.

The weight average molecular weight of the acrylic resin (E) is preferably 3000 or more, more preferably 3500 or more, still more preferably 4000 or more, and preferably 7500 or less, more preferably 6500 or less, and still more preferably 5500 or less.

The weight average molecular weight may be determined, for example, by gel permeation chromatography (GPC) using polystyrene as a standard.

The hydroxyl value of the acrylic resin (E) may be, for example, 40 mg KOH/g or more. The acid value of the hydroxy group-containing acrylic resin (E), for example, may be 0.1 mg KOH/g or more, and may be 20 mg KOH/g or less.

The hydroxyl value and the acid value may be those actually measured or calculated by a known method. For example, the hydroxyl value and the acid value may be measured in accordance with JIS K 0070:1992.

As the acrylic resin (E), two or more resins may be used in combination.

When the acrylic resin (E) is contained, the content of the acrylic resin (E) is not particularly limited, and may be, for example, 10% by mass or more and 50% by mass or less in the resin solid content of the coloring base coating material. If the blending amount of the acrylic resin (E) is excessively small, the viscosity of the coating material increases, and adverse effects occur during coating application. If the amount of the acrylic resin (E) is excessively large, the viscosity decreases, but the physical properties of a coating film deteriorate, leading to deterioration of adhesion and water resistance.

(6) Other Components

The coloring base coating material may contain an organic solvent.

Examples of such an organic solvent include ketones such as acetone, methyl ethyl ketone, methyl isobutyl ketone, and methyl amyl ketone; esters such as ethyl acetate, butyl acetate, amyl acetate, methyl benzoate, ethyl ethoxypropionate, ethyl propionate, and methyl propionate; ethers such as tetrahydrofuran, dioxane, and dimethoxyethane; glycol ethers such as ethylene glycol monomethyl ether, ethylene glycol monoethyl ether, diethylene glycol monomethyl ether, propylene glycol monomethyl ether acetate, and 3-methoxybutyl acetate; and aromatic hydrocarbons and aliphatic hydrocarbons.

The coloring base coating material of the present invention may comprise a curing catalyst, a viscosity modifier other than the crosslinked polymer fine particles (D), an antifoaming agent, an ultraviolet absorber, a light stabilizer (for example, a hindered amine), an antioxidant, a surface conditioning agent, a film-forming assistant, a rust inhibitor, and the like.

(7) Preparation of Coloring Base Coating Material

The method for producing the coloring base coating material is not particularly limited, and methods known in the art such as stirring, kneading, or dispersing the above-described components using a disper, a homogenizer, a roll, a sand grinding mill, a kneader, or the like can be used.

The coloring base coating material of the present invention is characterized in that when, using a cone-plate viscometer, a viscosity V1 is measured at a shear of 0.1/sec at 23° C., then the shear is changed from 0.1/sec to 25000/sec and applied for 30 seconds, and subsequently a viscosity V2 is measured after the shear is returned to 0.1/sec and then applied for one second, a viscosity recovery rate V2/V1, which is a ratio of V2 to V1, is 90% or more. The higher the viscosity recovery rate V2/V1, the more preferable it is. The viscosity recovery rate represents the ratio of the viscosity at a weak shear point and the viscosity at a strong shear point, and a high viscosity recovery indicates that the viscosity is recovered immediately even just after coating application. The coloring base coating material of the present invention rapidly recovers viscosity even just after application.

As a result, sagging of the coloring base coating material or movement of a flat bright material is prevented and the design property is maintained, and an intended coating film superior in FF property is obtained.

[Two-Pack Clear Coating Material]

On the coloring base coating film, a clear coating film may be provided by applying a two-pack clear coating material. The clear coating film is not particularly limited, and is formed using a two-pack clear coating material comprising a coating film-forming resin and, as necessary, a curing agent and the like. The two-pack clear coating film may contain a coloring component.

The two-pack clear coating composition is a coating material containing a hydroxy group-containing acrylic resin (F) and a polyisocyanate compound (G), which is a crosslinking agent, and usually, a two-pack clear coating material is constituted by forming the hydroxy group-containing polymer (F) into one package and forming the crosslinking agent composed of the polyisocyanate compound (G) into another package.

Hydroxy Group-Containing Acrylic Resin (F)

The hydroxy group-containing acrylic resin (F) has a hydroxyl value of 80 mg KOH/g or more and 220 mg KOH/g or less, a weight average molecular weight of 4,000 or more and 15,000 or less, and a glass transition temperature of 10° C. or higher and 60° C. or lower.

When the hydroxyl value is within such a range, a good crosslinking density can be imparted to the clear coating film, and superior weather resistance and the like can be imparted to the clear coating film and the multilayer coating film. Furthermore, the hydrophilization of the coating films can be suppressed, and the clear coating film and the multilayer coating film can have superior water resistance and superior moisture resistance.

Thanks to the fact that the weight average molecular weight is within such a range, for example, when a clear coating film-forming composition is applied onto a base coating film or an uncured base coating film, the occurrence of phase mixing of the clear coating film-forming composition with the base coating film can be controlled, so that a good appearance (finished appearance) of the clear coating film can be obtained. In addition, the quick-drying property of the clear coating film-forming composition can be improved.

In addition, the clear coating composition can have a moderate viscosity and the use of a solvent that reduces the viscosity at the time of applying the clear coating film-forming composition can be reduced, so that the increase in a volatile organic compound (VOC) can be controlled. Furthermore, the coating film obtained can have superior gasohol resistance, superior weather resistance, and a superior appearance.

The weight average molecular weight in the present description is a value measured by gel permeation chromatography using HLC-8200 manufactured by Tosoh Corporation. The measurement conditions are as follows.

| | |
|---|---|
| Column | TSgel Super Multipore HZ-M three columns |
| Developing solvent | tetrahydrofuran |
| Column inlet oven | 40° C. |
| Flow rate | 0.35 ml |
| Detector | RI |
| Standard polystyrene | PS oligomer kit manufactured by Tosoh Corporation |

When the glass transition temperature is within such a range, the clear coating film can be superior in stain resistance, scratch resistance, and hardness, and in addition, the quick-drying property of the clear coating film-forming composition is improved. Furthermore, the clear coating film can have a superior appearance.

The glass transition temperature as used herein is a value measured by the following process using a differential scanning calorimeter (DSC) (thermal analyzer SSC5200 (manufactured by Seiko Instruments Inc.)). Specifically, during a step of raising the temperature from 20° C. to 150° C. at a temperature raising rate of 10° C./min (step 1), a step of lowering the temperature from 150° C. to −50° C. at a temperature lowering rate of 10° C./min (step 2), and a step of raising the temperature from −50° C. to 150° C. at a temperature raising rate of 10° C./min (step 3), the value obtained from a chart at the time of raising the temperature in step 3 was taken as a glass transition temperature.

The hydroxy group-containing acrylic resin (F) has a solid acid value (AV) of 2 mg KOH/g or more and 20 mg KOH/g or less, and when the solid acid value is within such a range, a clear coating film having a superior appearance can be formed.

In addition, for example, in a mode in which a base coating film is formed adjacent to a clear coating film, it is possible to prevent layer mixing of the clear coating composition according to the present disclosure and the base coating composition (base coating film), and also possible to form a clear coating film having a superior design property.

Examples of a suitable monomer composition that can constitute the hydroxy group-containing acrylic resin (F) according to the present invention and satisfies the conditions described above include a composition comprising at least one ester selected from among hydroxy group-containing acrylic acid hydroxyesters such as 2-hydroxyethyl acrylate and 4-hydroxybutyl acrylate; and hydroxy group-containing methacrylic acid hydroxyesters such as 2-hydroxyethyl methacrylate and 4-hydroxybutyl methacrylate; and, as necessary, further comprising at least one monomer selected from among acrylic acid; acrylate esters such as methyl acrylate, butyl acrylate, isobutyl acrylate, t-butyl acrylate, 2-ethylhexyl acrylate, lauryl acrylate, and isoboronyl acrylate; methacrylic acid; methacrylate esters such as methyl methacrylate, butyl methacrylate, isobutyl methacrylate, t-butyl methacrylate, 2-ethylhexyl methacrylate, lauryl methacrylate, and isoboronyl methacrylate; and ethylenically unsaturated monomers having an aromatic ring such as styrene. The composition of the monomer composition may be appropriately adjusted according to various physical properties required for the hydroxy group-containing acrylic resin.

The monomer composition can be polymerized using a solvent, such as butyl acetate. The type of the solvent, the concentration of the monomer composition at the time of polymerization, and polymerization conditions such as the type and the amount of the polymerization initiator, the polymerization temperature, and the polymerization time can be appropriately adjusted according to various physical properties required for the hydroxy group-containing acrylic resin (F). For this reason, the method for producing the hydroxy group-containing acrylic resin (F) is not particularly limited, and a commercially available hydroxy group-containing acrylic resin (F) may be used.

Polyisocyanate Compound (G)

The clear coating film according to the present invention contains a polyisocyanate compound (G) as a coating film-forming resin. The curing reaction rate of the clear coating composition can be improved by using the polyisocyanate compound (G). In particular, as a result of the penetration of the polyisocyanate compound (G) in the two-pack clear coating material into a coloring base coating film layer, followed by curing, a multilayer coating film having superior water resistance can be formed.

The polyisocyanate compound (G) is not particularly limited as long as it is a compound having two or more isocyanate groups, and examples thereof include aromatic compounds such as tolylene diisocyanate, 4,4'-diphenylmethane diisocyanate, xylylene diisocyanate, and metaxylylene diisocyanate; aliphatic compounds such as hexamethylene diisocyanate; alicyclic compounds such as isophorone diisocyanate; and monomers thereof and multimers thereof such as biuret type multimers, nurate type multimers, and adduct type multimers. For example, the polyisocyanate compound (G) more preferably has isocyanurate and uretdione structures.

The two-pack clear coating composition to be used in the present invention may contain a viscosity controlling agent. Examples of the viscosity controlling agent include cross-linked or non-crosslinked resin particles, polyamide-based materials such as a swelling dispersion of aliphatic acid amide, amide-based aliphatic acid, and phosphate salts of long-chain polyaminoamide; and polyethylene-based materials such as a colloidal swelling dispersion of polyethylene oxide; organic bentonite-based materials such as organic acid smectite clay and montmorillonite.

In the present invention, the above-described two coating materials (namely, the coloring base coating material and the two-pack clear coating material) are applied to form uncured coating films (namely, a coloring base coating film and a two-pack clear coating film formed thereon), and then the two layers are baked and cured to form a multilayer coating film (a cured coating film superior in design property). Although the coating method has already been described, a cured multilayer coating film formed is superior in adhesion to an automobile part molded article, which is a substrate, and a multilayer coating film having a superior design property with few defects such as coating film peeling can be provided. When the multilayer coating film of the present invention is formed on not only the coloring base coating film and the two-pack clear coating film but also on the intermediate coating film and the primer coating film as described above, as a result, a three-layered or four-layered coating film is formed on a molded article for an automobile part made of a plastic material. When there are an intermediate coating film and a primer coating film, they may be uncured or cured, but when they are uncured, it is necessary to cure three or four uncured coating films in the last curing step, so that some changes may occur in the curing time and the curing temperature. However, the curing time and the curing temperature are basically within the ranges of the curing time and the curing temperature in the curing step described above.

The coated article with the multilayer coating film of the present invention formed is a molded article for an automobile part made of a plastic material, and can provide a highly designed appearance to an automobile part molded article made of a plastic material. Since the coloring base coating material of the present invention has a high solid content as compared with the conventional coloring base coating materials, the amount of an organic solvent to be released is reduced and the coloring base coating material can be applied thickly, so that the application time and the drying time are shortened. In addition, as compared with a coating method using an aqueous coating material, the necessity of a preheating step for drying the aqueous coating material is eliminated, so that energy consumption can be greatly improved and a coating facility is made compact. Therefore, it can be said to be a superior coating method.

EXAMPLES

Hereafter, the present invention will be described in detail by way of examples, but the present invention is not limited by the examples at all. In the examples, "parts" and "%" are on a mass basis unless otherwise indicated.

(Production Example 1) Production of Hydroxy Group-Containing Acrylic Resin (B-1)

A reactor equipped with a stirring blade, a thermometer, a dropping device, a temperature controller, a nitrogen gas inlet, and a cooling tube was charged with 57 parts of butyl acetate, and the temperature was raised to 120° C. under stirring while nitrogen gas was introduced. Next, a mixture of 0.5 parts of methacrylic acid, 53.1 parts of 2-ethylhexyl methacrylate, 18.1 parts of methyl methacrylate, 15.0 parts of styrene, and 13.3 parts of lactone-modified 2-hydroxyethyl methacrylate and a solution prepared by dissolving 2.0 parts of t-butyl peroxy-2-ethylhexanate in 5 parts of butyl acetate were added dropwise to the reactor over 3 hours. After completion of the dropwise addition, the mixture was aged for 1 hour, a solution prepared by dissolving 0.2 parts of t-butyl peroxy-2-ethylhexanate in 5 parts of butyl acetate was further added dropwise into the reactor over 1 hour, and the resulting mixture was aged for 2 hours while being maintained at 120° C. to complete the reaction. The obtained hydroxy group-containing resin had a nonvolatile content of 60% and a weight average molecular weight of 14500. The resin had a glass transition temperature of 20° C. and a hydroxyl value of 30 mg KOH/g. In Table 1, the blended monomer components, the characteristic values, the amounts of the polymerization initiator (t-butyl peroxy-2-ethylhexanate) in the first stage and the second stage, and the types of hydroxy groups (lactone-modified or not lactone-modified) are shown.

(Production Examples 2 to 4) Production of Hydroxy Group-Containing Acrylic Resins (B-2 to B-4)

In the same reactor as in Production Example B-1, hydroxy group-containing acrylic resins of Production Examples B-2 to B-10 were obtained by the same operation with the formulations shown in Table 1. The characteristic values and the like of the obtained hydroxy group-containing acrylic resins (B-2 to B-4) are also shown in Table 1.

versatic acid manufactured by Shell) is added dropwise over 30 minutes, then stirring is continued for 2 hours to complete the reaction. The resulting polyester resin had an acid value of 59, a hydroxyl value of 90, and Mn of 1054.

TABLE 1

| Resin production example | | B-1 | B-2 | B-3 | B-4 |
|---|---|---|---|---|---|
| Hydroxyl value (mg KOH/g) | | 30 | 50 | 20 | 20 |
| Glass transition temperature Tg (° C: calculated) | | 20 | 25 | 10 | 20 |
| Monomer | Lactone-modified 2-hydroxyethyl methacrylate | 13.3 | 20 | 8.9 | 8.9 |
| | 2-Hydroxyethyl methacrylate | — | 1.2 | — | — |
| | Methyl methacrylate | 18.1 | 22.4 | 8 | 18.5 |
| | 2-Ethylhexyl methacrylate | 53.1 | 41.1 | 67.8 | 57.3 |
| | Styrene | 15 | 15 | 15 | 15 |
| | Methacrylic acid | 0.5 | 0.3 | 0.3 | 0.3 |
| | Total | 100 | 100 | 100 | 100 |
| Solvent, total | | 67 | 67 | 67 | 67 |
| Polymerization | First stage | 2 | 2.5 | 1.8 | 0.8 |
| initiator | Second stage | 0.2 | 0.2 | 0.2 | 0.2 |
| Weight average molecular weight | | 14500 | 10500 | 18900 | 28200 |
| Type of hydroxy group | | Lactone | Lactone | Lactone | Lactone |

(Production Examples 5 to 6) Production of Acrylic Resins (E-1 to E-2)

In the same reactor as in Production Example B-1 described above, acrylic resins (E-1 to E-2) were obtained by the same operation with the formulations shown in Table 2, and the characteristic values (weight average molecular weight, amounts of polymerization initiator in first stage and second stage) thereof were shown in Table 2.

TABLE 2

| Resin production example | | E-1 | E-2 |
|---|---|---|---|
| Monomer | 2-Hydroxyethyl acrylate | 16.6 | 16.6 |
| | 2-Ethylhexyl acrylate | 48.6 | 48.6 |
| | Methyl methacrylate | 33.6 | 33.6 |
| | Methacrylic acid | 1.2 | 1.2 |
| | Total | 100 | 100 |
| Solvent, total | | 67 | 67 |
| Polymerization | First stage (t-butyl peroxide) | 10 | 3 |
| initiator | Second stage 2-ethylhexanate) | 0.2 | 0.2 |
| Weight average molecular weight | | 4500 | 9500 |

Reference Example 1

Method for Producing Polyester Resin Having Zwitterionic Group

A 2Q flask equipped with a stirrer, a nitrogen inlet tube, a temperature controller, a condenser, and a decanter was charged with 134 parts of bishydroxyethyltaurine, 130 parts of neopentyl glycol, 236 parts of azelaic acid, 186 parts of phthalic anhydride, and 27 parts of xylene, and the temperature is raised. Water produced through the reaction was removed azeotropically with xylene. The temperature is brought to 190° C. over about 2 hours from the start of refluxing, and stirring and dehydration were continued until the oxidation corresponding to the carboxylic acid reached 145, and then the mixture is cooled to 140° C.

Subsequently, the temperature is maintained at 140° C., and 314 parts of "CARDURA E10" (glycidyl ester of (Production Example 7) Production Example of Crosslinked Polymer Fine Particles D-1

A 1 L reaction vessel equipped with a stirrer, a cooler, and a temperature controller is charged with 281 parts of deionized water, 30 parts of the polyester resin having a zwitterionic group obtained in Reference Example 1, and 3 parts of dimethylethanolamine, and dissolved the mixture while the stirring temperature is maintained at 80° C., and then a solution prepared by dissolving 1.0 part of azobiscyanovaleric acid in 45 parts of deionized water and 0.9 parts of dimethylethanolamine is added thereto. Subsequently, a mixed solution of 30 parts of n-butyl acrylate, 70 parts of styrene, and 60 parts of ethylene glycol dimethacrylate is added dropwise over 60 minutes. After the dropwise addition, a solution prepared by dissolving 0.5 parts of azobiscyanovaleric acid in 15 parts of deionized water and 0.4 parts of dimethylethanolamine was further added, and the mixture was further continuously stirred at 80° C. for 2 hours to afford an emulsion having a nonvolatile content of 40% and a particle size of 0.12 µm. This emulsion was spray-dried to afford crosslinked polymer fine particles.

The crosslinked polymer fine particles were added to a solvent prepared by mixing methyl amyl ketone and xylene in a weight ratio of 1:1, and then adjusted to have a heating residue of 40% using an ultrasonic disperser, thereby affording a stable dispersion of crosslinked polymer particles.

(Production Example 8) Production Example of Crosslinked Polymer Fine Particles D-2

An emulsion having a particle size of 0.20 µm was obtained in the same apparatus as in the Production Example 7 described above except for using 5 parts of Na, di(2-ethylhexyl) sulfosuccinate in place of the polyester resin obtained in Reference Example 1. Similarly, this emulsion was spray-dried, ultrasonically dispersed in a mixed solvent, and adjusted to have a heating residue of 50%.

(Production Example 9) Production Example of Acrylic Polyol Resin AC-1 (for Clear)

A reactor equipped with a stirring blade, a thermometer, a dropping device, a temperature controller, a nitrogen gas inlet, and a cooling tube was charged with 57.33 parts of butyl acetate, and the temperature was raised to 125° C. under stirring while nitrogen gas was introduced. Next, a mixture of 10 parts of styrene, 0.46 parts of methacrylic acid, 29.23 parts of methyl methacrylate, 30.31 parts of 2-ethylhexyl acrylate, and 30.00 parts of 2-hydroxyethyl methacrylate and a solution prepared by dissolving 3.8 parts of t-butyl peroxy-2-ethylhexanate in 10 parts of butyl acetate were added dropwise to the reactor over 3 hours. After completion of the dropwise addition, the mixture was aged for 1 hour, a solution prepared by dissolving 0.2 parts of t-butyl peroxy-2-ethylhexanate in 10 parts of butyl acetate was further added dropwise into the reactor over 1 hour, and the resulting mixture was aged for 2 hours while being maintained at 125° C. to complete the reaction. The obtained hydroxy group-containing resin had a nonvolatile content of 60% and a mass average molecular weight of 11000.

(Production Examples 10 to 15) Coloring Base Coating Material Production Examples BA-1 to BA-6

By blending and stirring starting materials with the compositions provided in the following Table 3, coloring base coating materials BA-1 to BA-6 were obtained. The compositions in Table 3 are expressed in the unit of part(s) by mass, and are amounts in terms of a solid content excluding an organic solvent. The amount of the crosslinked polymer fine particles (D) represents the amount based on 100 parts by mass of the hydroxy group-containing acrylic resin (B), the blocked isocyanate compound (C), and the acrylic resin (E) in total.

At that time, a coating material having a nonvolatile content of less than 35% was evaluated as x and a coating material having a nonvolatile content of 35% or more was evaluated as ○. Boxes for the solid content at the time of coating are provided in Table 4, and ○ or x was entered in each of the boxes. In the case of x, the nonvolatile content at that time was shown.

(Production Example 16) Production of Two-Pack Clear Coating Material CL-1

To 100 parts in solid content of the acrylic polyol resin AC-1 obtained in Production Example 9, 0.15 parts of BYK-310 (manufactured by ALTANA) as a surface conditioning agent, 2 parts of Tinuvin 290 (manufactured by BASF SE) and 1 part of Tinuvin 384-2 (manufactured by BASF SE) as light stabilizers, and a nurate compound of hexamethylene diisocyanate in an amount adjusted such that the molar ratio of OH groups and NCO groups was 1 were added. The two-pack clear coating material was adjusted with a solvent prepared by mixing butyl acetate and Solvesso 100 at a weight ratio of 7:3 such that the nonvolatile content was 50%, and then was used for coating.

Examples 1 to 3 and Comparative Examples 1 to 5

(Preparation of Coated Article)
The coloring base coating material of Production Example BA-1 was applied to a surface of an ABS resin substrate (150 mm×150 mm×3 mm) wiped with isopropyl alcohol under an environment of 25° C./70% RH under the following conditions in two stages using a ROBOBEL 951

TABLE 3

| Composition of coloring base coating material | Coloring Base Coating Material Production Example BA-1 | Coloring Base Coating Material Production Example BA-2 | Coloring Base Coating Material Production Example BA-3 | Coloring Base Coating Material Production Example BA-4 | Coloring Base Coating Material Production Example BA-5 | Coloring Base Coating Material Production Example BA-6 |
|---|---|---|---|---|---|---|
| Hydroxy group-containing acrylic resin: B-1 | 55 parts | | | | | 55 parts |
| Hydroxy group-containing acrylic resin: B-2 | | 55 parts | | | 55 parts | |
| Hydroxy group-containing acrylic resin: B-3 | | | 45 parts | | | |
| Hydroxy group-containing acrylic resin: B-4 | | | | 55 parts | | |
| Blocked isocyanate compound (C) | 15 parts | 15 parts | 20 parts | 15 parts | 15 parts | 15 parts |
| Acrylic resin: E-1 | 30 parts | 30 parts | 35 parts | 30 parts | | 30 parts |
| Acrylic resin: E-2 | | | | | 30 parts | |
| Crosslinked polymer fine particles: D-1 | 20 parts | | | 20 parts | 20 parts | None |
| Crosslinked polymer fine particles: D-2 | | 20 parts | 15 parts | | | |
| Pigment (A) Pigment concentration PWC (%) | 15% | 15% | 15% | 15% | 15% | 15% |

Starting materials (Coloring Base Coating Material Production Examples BA-1 to BA-6) in Table 3 will be described.

Blocked isocyanate compound (C): manufactured by Asahi Kasei Chemical Corporation, trade name: DURANATE MF-K60B Pigment (A): aluminum (scaly pigment), manufactured by Toyo Aluminium K.K., trade name: ALPASTE 07-0674

Organic solvent: methyl amyl ketone, Solvesso 100 (manufactured by Exxon Mobil Corporation)

(Preparation of Coloring Base Coating Material)
Coloring Base Coating Material Production Examples BA-1 to BA-6 are adjusted to have a viscosity in a No. 4 Ford cup of 12 seconds to 14 seconds in a state with a coating material temperature of 20° C. using methyl amyl ketone/Solvesso 100=1/1 (weight ratio) as a dilution thinner.

while the discharge amount was adjusted such that the dry film thickness was 15 μm. (Gun distance: 150 mm, pitch width: 65 mm, gun speed: 700 mm/s as standard coating condition, rotation speed: 25000 rpm, shaping air pressure: 0.2 MPa) Thereafter, setting was performed at room temperature for 5 minutes.

The two-pack clear coating material CL-1 was applied thereon in one stage similarly using ROBOBEL 951 (gun distance: 200 mm, gun speed: 700 mm/s, rotation speed: 25000 rpm, shaping air pressure: 0.07 MPa) under the following conditions such that the dry film thickness was 25 μm. Then, after setting for 10 minutes, followed by drying at 80° C. for 30 minutes, the coated article of Example 1 was prepared.

In addition, as a method of examining whether it is possible to shorten the application time, a coated article for evaluating the unevenness (unevenness of coating film) and the flip-flop property (FF property) was prepared by the same coating method except that the gun speed at the time of coloring base coating was set to 1100 mm/s.

Examples 2 to 3 and Comparative Examples 1 to 5, which are coated articles, were obtained by the same coating method using the coating materials shown in the following Table 4 as a coloring base coating material and/or a clear. It is noted that in Comparative Example 5 drying was carried out at 100° C. for 30 minutes. In Comparative Example 4, a commercially available silver-colored coating material "R160-1 Silver" from Nippon Paint Automotive Coatings Co., Ltd. was used as the coloring base coating material. In Comparative Example 5, a melamine-curable one-pack clear coating material "R3510FHI" commercially available from Nippon Paint Automotive Coatings Co., Ltd. was used as a clear coating material.

First, regarding the coating workability in the production of a coated article, the application time shortenability and the estimation of the amount of solvent volatilization were evaluated in the following manner, and are shown in Table 4.

(Application Time Shortenability)

For coated articles produced by applying a coloring base coating material at a gun speed of 700 mm/s and a high-speed condition of 1100 mm/s and employing the same conditions except for the adjustment of the discharge amount, the unevenness (unevenness of coating film) and the flip-flop property (FF property) were evaluated by the following methods. When all the coated articles passed (○) regardless of the gun speed, this was determined as pass (○). When at least one of the unevenness and the FF property failed, it was determined as fail (x).

(Amount of Solvent Volatilization)

When a substrate made of ABS resin (150 mm×150 mm×3 mm) was coated so as to have a dry film thickness of 15 μm in Example 1, the index of the coloring base coating material of Production Example BA-1 used was defined as 100, and the used amounts of the coloring base coating materials of Examples and Comparative Examples were compared with each other on the basis of index and evaluated as the amount of solvent volatilization. Conditions except the coating material discharge amount were unified, and the gun speed was set to a standard application condition.

In addition, using the coloring base coating materials and the coated articles obtained, unevenness (unevenness of coating film), adhesion, water resistance, coating film hardness, viscosity recovery rate, and flip-flop property (FF property) were evaluated in the following manner. The results are shown in Table 4.

(Unevenness of Coating Film)

The test panel obtained under the conditions described above was visually observed from an angle of 25 degrees on the front and an angle of 75 degrees on the diagonal, and the orientation of a pigment was observed.

The evaluation criteria are as follows, and ○ was regarded as pass and x was regarded as fail.
  ○: The orientation looks uniform at both of the angles.
  x: The orientation looks non-uniform at both or one of the angles.

(Adhesion)

The coating film of a test piece obtained from a coated article was subjected to a cross-cut CELLOTAPE (registered trademark) peeling test in accordance with JIS K 5600-5-6: 1999. 100 cross-cuts 2 mm on each side were prepared, a cellophane tape peeling test was performed, and the number of cross-cuts not peeled off was counted.

The evaluation criteria are as follows, and ○ was regarded as pass and x was regarded as fail.
  ○: 0/100 (not peeled)
  x: 1/100 to 100/100 (peeled)

(Water Resistance)

A test piece obtained from a coated article was immersed in a water-resistant bath at 40° C. for 240 hours. After completion of the immersion, the coating film of the test piece taken out from the water-resistant bath was subjected to a cross-cut CELLOTAPE (registered trademark) peeling test and appearance observation in accordance with JIS K 5600-5-6:1999 within 1 hour after being taken out. 100 cross-cuts 2 mm on each side were prepared, a cellophane tape peeling test was performed, and the number of cross-cuts not peeled off was counted. In addition, as to the appearance, whether there was any abnormality such as blister was examined.

The evaluation criteria are as follows, and ○ was regarded as pass and x was regarded as fail.
  ○: 0/100 (not peeled), and here was no appearance abnormality.
  Δ: 0/100 (not peeled), there was appearance abnormality.
  x: 1/100 to 100/100 (peeled), irrelevant to appearance abnormality.

(Coating Film Hardness)

The coated plate obtained above was allowed to stand at room temperature for 5 days, and then pencil scratch hardness was measured. The pencil used was a Mitsubishi UNI pencil for a scratch value test. In the measurement operation, the coated plate was placed and fixed on a horizontal table. With the pencil held such that the angle between the coated plate and the pencil with the lead thereof exposed in a cylindrical shape was 45 degrees and with the lead pressed against the coated plate as strongly as possible with the pencil prevented from breaking, the pencil was pushed forward at a speed of about 1 cm/sec to scratch the coating surface. This operation was carried out five times with pencils having the same concentration, and a set in which scratches or tears occurred twice or more and less than twice was found with respect to two grades of pencil whose concentration symbols were next to each other, and the concentration symbol of the pencils with which scratches or tears occurred less than twice was defined as the pencil hardness of the coating film.

Judgment criteria are as follows.

| HB or more | ○ (good) |
| B or less | x poor) |

(Viscosity Recovery Rate)

Using a cone-plate viscometer "DHR-3" manufactured by TA Instruments, the viscosity V1 was measured at a shear of 0.1/sec at 23° C., then the shear was changed from 0.1/sec to 25000/sec and applied for 30 seconds, and subsequently the viscosity V2 was measured after the shear was returned to 0.1/sec and then applied for one second. From the measured V1 and V2, the viscosity recovery rate V2/V1 [%] was calculated.

The evaluation criteria are as follows, and ○ was regarded as pass and x was regarded as fail.
  ○: The viscosity recovery rate is 90% or more.
  x: The viscosity recovery rate is less than 90%.

(Flip-flop property (FF property)) L values were measured at measurement angles of 25 degrees and 75 degrees using "CM-512m3" (multi-angle spectrophotometer manufactured by KONICA MINOLTA, INC.), and then an FF value (L value at 25 degrees/L value at 75 degrees) was calculated. The evaluation criteria are as follows, and ○ was regarded as pass and x was regarded as fail.
  ○: The FF value is 2.2 or more.
  x: The FF value is less than 2.2.

TABLE 4

|  | Example 1 | Example 2 | Example 3 | Comparative Example 1 |
|---|---|---|---|---|
| Coloring base coating material | Base Production Example BA-1 | Base Production Example BA-2 | Base Production Example BA-3 | Base Production Example BA-4 |
| Clear coating material | Two-Pack Clear Production Example CL-1 | Two-Pack Clear Production Example CL-1 | Two-Pack Clear Production Example CL-1 | Two-Pack Clear Production Example CL-1 |
| Gun speed mm/sec (coating method) | 700    1100 | 700    1100 | 700    1100 | 700    1100 |
| Solid content at the time of coating application: 35% or more = ○ | ○ | ○ | ○ | 20% (X) |
| Application time shortenability | ○ | ○ | ○ | X |
| Amount of solvent volatilization | 100%   100% | 100%   100% | 100%   100% | 180%   180% |
| Unevenness of coating film | ○    ○ | ○    ○ | ○    ○ | ○    X |
| Adhesion | ○    ○ | ○    ○ | ○    ○ | ○    ○ |
| Water resistance | ○    ○ | ○    ○ | ○    ○ | ○    ○ |
| Coating film hardness | ○    ○ | ○    ○ | ○    ○ | ○    ○ |
| Viscosity recovery rate [%] | ○ | ○ | ○ | ○ |
| FF property | ○    ○ | ○    ○ | ○    ○ | ○    X |

|  | Comparative Example 2 | Comparative Example 3 | Comparative Example 4 | Comparative Example 5 |
|---|---|---|---|---|
| Coloring base coating material | Base Production Example BA-5 | Base Production Example BA-6 | R160-1 Silver | Base Production Example BA-1 |
| Clear coating material | Two-Pack Clear Production Example CL-1 | Two-Pack Clear Production Example CL-1 | Two-Pack Clear Production Example CL-1 | R3510FHI |
| Gun speed mm/sec (coating method) | 700    1100 | 700    1100 | 700    1100 | 700    1100 |
| Solid content at the time of coating application: 35% or more = ○ | 25% (X) | 32% (X) | 25% (X) | ○    ○ |
| Application time shortenability | X | X | X | ○    ○ |
| Amount of solvent volatilization | 140%    — | 120%   120% | 140%   140% | 100%   100% |
| Unevenness of coating film | ○    X | X    X | ○    X | ○    ○ |
| Adhesion | ○    ○ | ○    ○ | ○    ○ | X (Peeling in base layer) |
| Water resistance | ○    ○ | ○    ○ | ○    ○ | X (Peeling in base layer) |
| Coating film hardness | ○    ○ | ○    ○ | ○    ○ | ○    ○ |
| Viscosity recovery rate [%] | ○ | X | X | ○    ○ |
| FF property | ○    X | X    X | ○    X | ○    ○ |

In Examples, the solid content is 35% or more and the viscosity recovery rate is 90% or more, and multilayer coating films having a high solid content and being superior in adhesion and FF property are obtained. In Comparative Examples 1 and 2, the solid content is as low as 20% and 25%, and the application time shortenability is insufficient. In addition, when the gun speed increased, unevenness occurred, and the FF property also deteriorated. In Comparative Example 3, the solid content during application is as slightly low as 32%, and the application time shortenability deteriorates. In Comparative Example 3, the coloring base coating material did not contain crosslinked polymer fine particles, had a poor viscosity recovery rate was poor, and was difficult to use. In Comparative Example 4, the coloring base coating material was commercially available, and the solid content at the time of application was as insufficient as 25%, and the application time shortenability was insufficient. In Comparative Example 5, a commercially available clear coating material having a high solid content was used, but adhesion and water resistance were greatly insufficient. This is considered to be because migration of the isocyanate compound from the clear coating film to the coloring base coating film did not occur, and peeling off occurred at the base layer.

The invention claimed is:

1. A method for applying a multilayer coating film onto a molded article for an automobile part made of a plastic material, the method comprising:

a step of applying a coloring base coating material onto the molded article for an automobile part to form an uncured first coating film;

a step of applying a two-pack clear coating composition onto the uncured first coating film to form an uncured second coating film; and a step of baking and curing the uncured first coating film and the uncured second coating film to form a multilayer coating film;

wherein the coloring base coating material is a coloring base coating material including:

a pigment (A), a hydroxy group-containing acrylic resin (B), a blocked isocyanate compound (C), crosslinked polymer particles (D) insoluble and stably dispersed in a solution of the hydroxy group-containing acrylic resin (B), and an acrylic resin (E) having a weight average molecular weight different from that of the hydroxy group-containing acrylic resin (B), the coloring base coating material has a solid content of 35% by mass or more, when, using a cone-plate viscometer, a viscosity V1 is measured at a shear of 0.1/see at 23° C., then the shear is changed from 0.1/see to 25000/see and applied for 30 seconds, and subsequently a viscosity V2 is measured after the shear is returned to 0.1/see and then applied for one second, a viscosity recovery rate V2/V1, which is a ratio of V2 to V1, is 90% or more, and the two-pack clear coating composition includes a hydroxy group-containing polymer (F) and an isocyanate compound (G).

2. The method for applying a multilayer coating film onto a molded article for an automobile part of claim 1, wherein the hydroxy group-containing acrylic resin (B)

is a polymer of one or more monomers including a hydroxy group-containing monomer (b), wherein the hydroxy group-containing monomer (b) is a lactone-modified product of a monoester compound derived from (meth)acrylic acid with a dihydric alcohol having 2 or more and 8 or less carbon atoms, has a weight average molecular weight of 10000 or more and 20000 or less, has a glass transition temperature of 10° C. or higher and 40° C. or lower, and has a hydroxyl value of 10 mg KOH/g or more and 50 mg KOH/g or less.

3. The method for applying a multilayer coating film onto a molded article for an automobile part of claim 1, wherein the acrylic resin (E) has a weight average molecular weight of 3000 or more and 7500 or less.

4. The method for applying a multilayer coating film onto a molded article for an automobile part of claim 1, wherein an intermediate coating film or a primer coating film is formed in advance on the molded article for an automobile part.

5. A coated article produced by the method for applying a multilayer coating film onto a molded article for an automobile part of claim 1.

* * * * *